US008718540B2

(12) United States Patent
Johansson et al.

(10) Patent No.: US 8,718,540 B2
(45) Date of Patent: May 6, 2014

(54) METHODS AND ARRANGEMENTS FOR FREQUENCY SELECTIVE REPETITION (75) Inventors: Niklas Johansson, Sollentuna (SE); Gunnar Mildh, Sollentuna (SE); Pål Frenger, Linköping (SE); Peter Larsson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 819 days.

(21) Appl. No.: 12/996,678

(22) PCT Filed: Jun. 22, 2009

(86) PCT No.: PCT/SE2009/050780
§ 371 (c)(1),
(2), (4) Date: Dec. 7, 2010

(87) PCT Pub. No.: WO2009/157861
PCT Pub. Date: Dec. 30, 2009

(65) Prior Publication Data
US 2011/0081856 A1    Apr. 7, 2011

Related U.S. Application Data (60) Provisional application No. 61/075,082, filed on Jun. 24, 2008.

(51) Int. Cl.
*H04B 3/36*    (2006.01)
(52) U.S. Cl.
USPC .............................................. 455/7; 370/315
(58) Field of Classification Search
CPC ......... H04B 7/15542; H04W 72/0406; H04W 72/0453
USPC .............................................. 455/7; 370/315
See application file for complete search history.

(56) References Cited

U.S. PATENT DOCUMENTS

2006/0205342 A1    9/2006    McKay, Sr. et al.

FOREIGN PATENT DOCUMENTS

| CN | 2872749 Y | 2/2007 |
|----|-----------|--------|
| EP | 1 804 397 A1 | 7/2007 |
| WO | WO 2005/117433 A1 | 12/2005 |

OTHER PUBLICATIONS

Chinese First Office Action and Search Report Corresponding to Chinese Patent Application No. 200980125057.1; 4 Pages, Mar. 21, 2013.
Ericsson "A discussion on some technology components of LTE-Advanced" 3GPP Meeting, TSG-RAN WG1 #53, No. R1-082024, Kansas City, MO., May 5-9, 2008.

(Continued)

*Primary Examiner* — Raymond Dean
(74) *Attorney, Agent, or Firm* — Myers Bigel Sibley & Sajovec, P.A.

(57) ABSTRACT

Methods and apparatuses for enabling frequency selective repetition of signals in a telecommunication system in which aggregation of component carriers is applied. Information signals are received in a first set of frequency bands, which is defined to cover anchor carriers, which can be used by both legacy and non-legacy terminals. Further, information is received in a second set of frequency bands, which is defined to cover non-anchor carriers, which only can be used by non-legacy terminals. Instructions concerning which frequency band(s) that should be repeated by the repeater node, are also received. Thereafter, the frequency bands indicated in the instructions are filtered out, after which these frequency bands or parts are repeated by the repeater node. This results in enabling frequency selective repetition in a system which may comprise legacy mobile, which limits the interference in the system, which enables higher bitrates and saves energy.

24 Claims, 8 Drawing Sheets (56) References Cited

OTHER PUBLICATIONS

Ericsson "Carrier aggregation in LTE-Advance" 3GPP Meeting, TSG-RAN WG1 #53bis, No. R1-082468, Warsaw, Poland, Jun. 30-Jul. 7, 2008.

International Search Report, PCT Application No. PCT/SE2009/050780, Date of Mailing: Aug. 28, 2009.

International Preliminary Report on Patentability, PCT/SE2009/050780, Date of Completion: Aug. 24, 2010.

Written Opinion of the International Searching Authority, PCT/SE2009/050780, Date of Mailing: Aug. 28, 2009.

Singapore Written Opinion from Danish Patent and Trademark Office Corresponding to Application No. SG 201008223-8; Date of Mailing: Dec. 8, 2011; 11 pages.

100
Aggregated bandwidth of 100 MHz

Figur 10a

METHODS AND ARRANGEMENTS FOR FREQUENCY SELECTIVE REPETITION

CROSS REFERENCE TO RELATED APPLICATIONS

This application is a 35 U.S.C. §371 national stage application of PCT International Application No. PCT/SE2009/050780, filed on Jun. 22, 2009, which claims the benefit of priority of U.S. Provisional Application No. 61/075,082, filed Jun. 24, 2008. The above-referenced PCT International Application was published in the English language as International Publication No. WO 2009/157861 on Dec. 30, 2009. The disclosures of both of the above referenced applications are hereby incorporated herein in their entireties by reference.

TECHNICAL FIELD

The invention relates to a method and an arrangement in a communication system, in particular to methods and arrangements for enabling backwards compatible frequency selective repetition in an E-UTRAN (Evolved Universal Terrestrial Radio Access Network).

BACKGROUND

Repeaters are widely used in wireless communication systems in order to re-amplify electromagnetic signals. Repeaters receive, amplify and retransmit signals of a particular channel. Due to the amplification, the signal can propagate over longer distances and thereby increase the reach of the signal, or, a better signal quality is provided at a receiver of the signal, i.e., a better signal to noise and interference ratio is provided. Repeaters may also be referred to as layer-1 relays or amplify-and-forward relays.

A signal, which has been amplified in a repeater, can either be transmitted by the repeater on a different frequency band than the one the original signal was received in, which is referred to as "frequency translating", or the amplified signal can be transmitted on the same frequency band as the original signal was received in, which is referred to as "on-frequency". In the latter case, the transmitted amplified signal will cause self interference, since it will interfere with the reception of the original signal in the repeater. This self-interference can be avoided, e.g. by means of separated antennas, self-interference cancellation techniques, or by electronic components, such as circulators.

A conventional repeater continuously amplifies the entire channel bandwidth. The repeater amplifies all resources such as TDMA (Time Division Multiple Access) time slots, FDMA (Frequency Division Multiple Access) sub channels, or OFDMA (Orthogonal Frequency Division Multiple Access) resource blocks, even when the resources are currently not used for transmission, or when the resources do not need repeater support in order to reach their destination. Thus, energy is wasted whenever the repeater amplifies these resources in the described situations.

Conventional repeaters are used in order to amplify resources comprising desired downlink carrier signals or desired uplink carrier signals, which signals need repeater support. However, the repeaters also amplify resources with undesired signals. Undesired signals on these resources are for instance, apart from self interference:

Interference from a neighboring cell. If this interfering signal is amplified by the repeater it will degrade the signal quality within the cell;

Signals which do not need repeater support in order to reach their destination. These signals cause interference to neighboring cells if they are amplified, and may also interfere with the original direct signal in a receiver if a processing delay introduced by an on-frequency repeater exceeds the allowed limit;

The receiver noise of the repeater, which causes interference within the cell and towards neighboring cells if it is amplified.

In a conventional repeater, the transmit power of the repeater is equally distributed across the amplified channel bandwidth. The power amplifier of the repeater constitutes the limit to the power spectral density of the amplified signal. If the transmit power of the repeater were to be concentrated only to certain frequency resources, e.g. subcarriers in OFDMA or sub channels in FDMA, the power spectral density of the amplified signal could be increased. This would either enable the use of less powerful and less expensive amplifiers in the repeater or it would enable an increase of the signal quality and range.

One way to alleviate the above mentioned problems is to design a frequency selective repeater, i.e. a repeater which only amplifies the resources, e.g. resource blocks in LTE, which are beneficial for a communication. A frequency selective repeater can be controlled by a base station to only repeat resources that are in use by mobile stations, which are scheduled by that base station. Furthermore, a mobile station with a strong radio link to the serving base station does not need support from the repeater and hence resources used to communicate with that mobile station should not be amplified by the repeater, in order to avoid that unnecessary interference is forwarded by the repeater.

Figure 4:
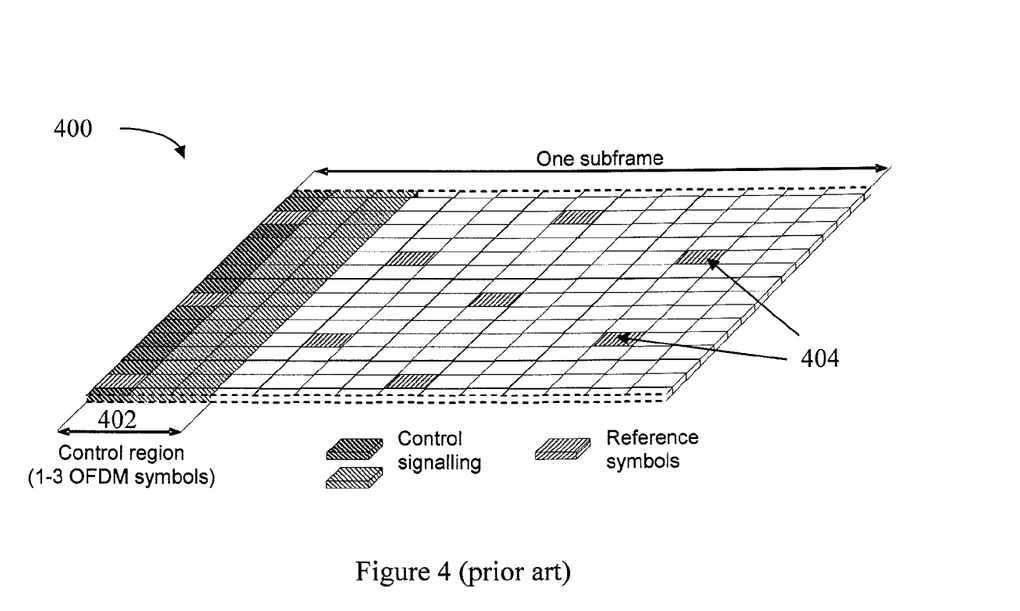
FIG. 4 illustrates a physical resource element mapping in downlink of E-UTRAN according to prior art.
Figure 5:
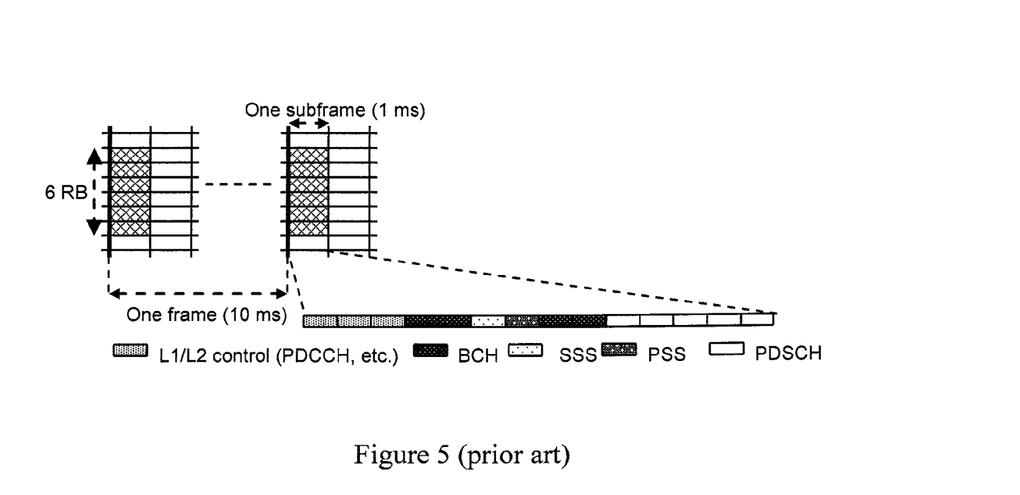
FIG. 5 illustrates allocation of BCH, SSS, and PSS in the downlink of E-UTRAN according to prior art.

However, there are a number of reasons why frequency selective repetition as described above does not work directly in LTE downlink, which is also illustrated in FIGS. 4 and 5:

The downlink control channels cover the whole bandwidth, which means that the whole bandwidth must be repeated;

The downlink demodulation reference symbols are used also for mobility measurements, which means that all resources carrying demodulation reference symbols must be repeated;

Paging messages could be scheduled anywhere, which means that paging messages could be lost if certain resources were not repeated;

Mobile terminals, also called UEs (User Equipment), need to be able to receive the BCH (broadcast channel) and the PSS and SSS (primary and secondary synchronisation signals), which means that the resources used for BCH, SSS, and PSS must be repeated.

Figure 6:
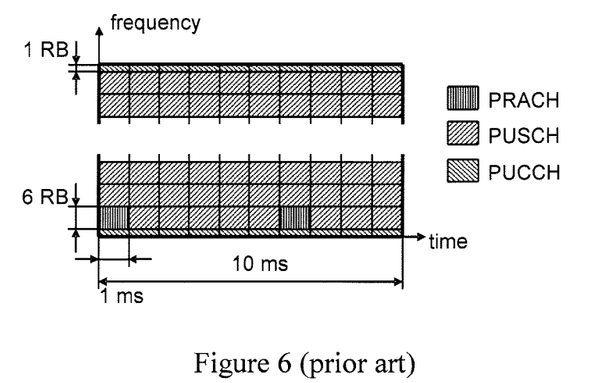
FIG. 6 illustrates physical resource usage in the uplink of E-UTRAN according to prior art.

Further, frequency selective repetition in the LTE uplink is complicated by the following, which is illustrated in FIG. 6:

Mobile terminals could be scheduled anywhere in the frequency domain, which means that data related to a mobile terminal may be lost if the resources used by that mobile terminal are not repeated.

The control channels are located at the frequency edges, which makes filtering challenging.

The RACH (Random Access Channel) must reach the base station, which means that the resources used for RACH must be repeated.

E-UTRAN, which is also denoted Long-Term Evolution, LTE, of UTRAN, as standardised in Release-8 by the 3GPP, supports bandwidths up to 20 MHz. However, in order to meet the upcoming IMT-Advanced requirements (International Mobile Telecommunications), work on advanced systems has been initiated, which may be referred to as "LTE-Advanced".

Figure 1:
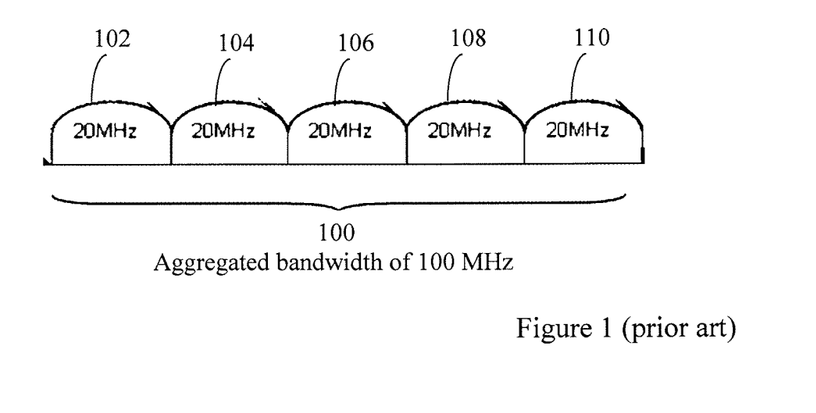
FIG. 1 illustrates carrier aggregation according to prior art.

One of the parts of LTE-Advanced is to support bandwidths larger than 20 MHz. One important requirement on developers of LTE-Advanced is to assure backward compatibility with LTE Release-8 terminals, i.e. that legacy terminals should be able to function within LTE-Advanced. This should also include spectrum compatibility. That would imply that an LTE-Advanced carrier, wider than 20 MHz, should have the possibility to appear as a number of LTE carriers to an LTE Release-8 terminal. Each such carrier can be referred to as a Component Carrier. The straightforward way to obtain such LTE-Advanced carriers wider than 20 MHz would be by means of carrier aggregation. Carrier aggregation implies that an LTE-Advanced terminal can receive multiple component carriers, where the component carriers have, or at least have the possibility to have, the same structure as a Release-8 carrier. Carrier aggregation is illustrated in FIG. 1, where five component carriers of 20 MHz each are aggregated to a 100 MHz carrier.

SUMMARY

It is desirable to obtain a backwards compatible frequency selective repetition for E-UTRAN. Therefore, it is an object of the present invention to address at least some of the issues outlined above. Further it is an object of the invention to provide a mechanism for enabling backwards compatible frequency selective repetition in E-UTRAN. These objects are met by the methods and apparatuses described in the attached independent claims.

The following aspects and embodiments are provided in a telecommunication system in which aggregation of component carriers is applied.

According to one aspect, a method is provided in a repeater node. In the method, information signals are received in two different sets of frequency bands: a first set of frequency bands, which can be used by both legacy and non-legacy terminals; and a second set of frequency bands, which can be used only by non-legacy terminals. The repeater node further receives instructions of which frequency band(s) that should be repeated. According to the received instructions, the repeater node then filters out and repeats the frequency bands in question. The fact that the component carriers are divided into the two categories anchor carriers, which are covered by the first set of frequency bands; and non-anchor carriers, which are covered by the second set of frequency bands, enables a well defined frequency selective repetition, where only the component carriers which need to be repeated are repeated.

According to another aspect, a repeater node is adapted to enable frequency selective repetition of signals. The repeater node comprises a receiving unit, which receives information in the two different sets of frequency bands described above. The receiving unit also receives instructions concerning which frequency band(s) or subset thereof to repeat. Further, the repeater node comprises a filtering unit, which filters out the frequency band(s), which should be repeated by the repeater node according to the received instructions. The repeater node also comprises a repeating unit, which repeats the frequency band(s) or parts thereof, which should be repeated by the repeater node according to the received instructions.

According to yet another aspect, a method is provided in a base station for enabling frequency selective repetition. In the method, information is transceived, i.e. transmitted or received on two different sets of component carriers: anchor carriers and non-anchor carriers. Further, instructions to a repeater node concerning which of the component carrier(s) or subset thereof to repeat are created, and transmitted to the repeater node. Also here, the fact that the component carriers are divided into the two categories: anchor carriers, which can be used by both legacy and non-legacy terminals, and non-anchor carriers, which can be used only by non-legacy terminals, enables a well defined frequency selective repetition, where only the component carriers which need to be repeated are repeated.

According to yet another aspect, a base station is adapted to enable frequency selective repetition. The bases station comprises a transceiving unit, which is adapted to transceive information on a first set of component carriers defined to be anchor carrier(s), and a second set of component carriers defined to be non-anchor carrier(s). The bases station further comprises an instruction creating unit, which creates instructions to a repeater node concerning which component carrier(s) or subset thereof that should be repeated by the repeater node. Further, the base station comprises a transmitting unit, which transmits the instructions to the repeater node.

All of the aspects above are relevant to uplink and/or downlink communication.

According to the above described aspects, frequency selective repetition can be enabled in a system which may comprise legacy mobile stations which are not "aware" of the existence of such frequency selective repeaters, i.e. they function according to a version of a standard or protocol in which frequency selective repetition was not used. This is an advantage, since it may take significant time before all users have changed their legacy equipment to a new or upgraded version after a system upgrade. Frequency selective repetition is desirable, since it limits the interference in the system, which enables higher bitrates and saves energy.

Different embodiments are possible in the methods and nodes described above. The embodiments below are described in relation to the aspect of a method in a repeater node, but the described embodiments are also relevant for the other aspects, which are adapted in a corresponding way.

In one exemplary embodiment, the granularity of the filtering is matched to the bandwidth of each component carrier in a set of component carriers. This enables efficient selective filtering of the component carriers.

In another embodiment, the granularity of the filtering of a component carrier can be finer than the bandwidth of said component carrier, i.e. one component carrier could be matched by more than one filter, which e.g. enables filtering out parts of a component carrier. The granularity could also be different for anchor and non-anchor carriers.

In one embodiment, the sets of frequency bands are dynamically adjusted to match the distribution of the load on respective set of frequency bands. This enables appropriate filtering also when the load varies on the different sets of frequency bands, which is an advantage.

The bandwidth of the component carrier(s) and/or the amount of component carriers can be dynamically adjusted.

A new anchor carrier may be created either by reconfiguring a non-anchor carrier or by creating a new component carrier and configuring said new component carrier to be an anchor carrier.

In another embodiment, at least a part of the first set of frequency bands is repeated by the repeater. This would e.g. help newly arrived or switched on mobile terminals in the repeater service area to make contact with the cell.

The different features of the exemplary embodiments above may be combined in different ways according to need, requirements or preference.

BRIEF DESCRIPTION OF THE DRAWINGS

The invention will now be explained in more detail by means of example embodiments and with reference to the accompanying drawings, in which.

DETAILED DESCRIPTION

Figure 2:
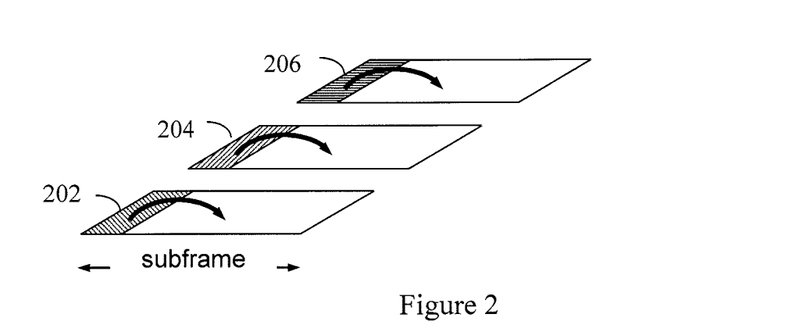
FIGS. 2 and 3 illustrate different alternatives of control signalling in aggregated component carriers
Figure 3:
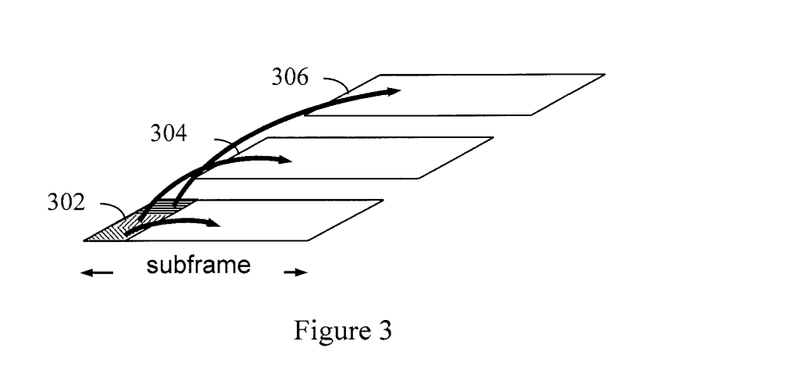

In a carrier aggregation scenario in for example LTE-Advanced, at least two alternatives for implementation of L1/L2 control signalling can be considered:

- either each component carrier comprises its own control signalling, i.e. in case a terminal is scheduled on multiple component carriers, information about a particular component carrier is included on the PDCCH on that particular component carrier as illustrated in FIG. 2, or
- the control signalling on one component carrier can point to resource blocks on multiple component carriers as illustrated in FIG. 3.

In the first alternative, illustrated in FIG. 2, the signalling structure on each component carrier can be identical to the signalling structure of Release-8 of LTE. However, in the second alternative, illustrated in FIG. 3, the control signalling needs to be able to point to resource blocks on multiple component carriers, which is not possible in the signalling structure of Release-8 of LTE.

Within this document, the term anchor carrier will be used as referring to a carrier comprising control signalling, which points to resource blocks within its own carrier and potentially also to resource blocks on other component carriers, and which carrier is accessible to both legacy (e.g. LTE-Release 8) and non-legacy (e.g. LTE Release-10) mobile terminals. Non-anchor carriers, on the other hand, are accessible only to non-legacy terminals, which also can read the control signalling relating to a non-anchor carrier on an anchor carrier. Frequency selective repetition of anchor carriers is prohibited by e.g. that the control channels cover the whole bandwidth of the carrier The base of this solution is to divide the available spectrum in a cell into anchor carriers and non-anchor carriers. Briefly described, a solution is provided for enabling frequency selective repetition in a system which may comprise different types of mobile terminals, such as legacy and non-legacy terminals. The term "legacy mobile terminal" is here used as referring to a mobile station which is functioning according to a previously released version of a certain standard or protocol, as for example Release-8 of LTE, and the terms "non-legacy" or "newer" mobile terminal are here used as referring to a mobile terminal which is functioning according to a more recent version of a standard or protocol, such as for example Release-10 of LTE. The system described herein comprises at least one base station, at least one repeater node, possibly one or more legacy mobile stations and possibly one or more newer mobile stations.

The spectrum arrangement, in which the frequency selective repeater node is intended to function, comprises more than one component carrier, where each component carrier is either an anchor carrier or a non-anchor carrier. The newer mobile stations can communicate on every available component carrier while the legacy mobile stations only can communicate using an anchor carrier.

Further, within this document the terminology concerning component carriers and sets of frequency bands will be as follows: the base station and the mobile terminals transmit and receive a set of component carriers, whereas the repeater node repeats a set of frequency bands. One frequency band could cover one or more component carriers, or part of a component carrier, i.e. one component carrier could be covered by one or more frequency bands, or by a part of a frequency band. However, the repeater node may also, as an effort to simplify the language, be described as repeating different carriers. The above mentioned terminology should then be kept in mind.

The base station, to which a frequency selective repeater node is connected, controls the size and location of the different component carriers, and controls which carriers that should be defined as anchor carriers and non-anchor carriers, respectively. The base station also decides which anchor carrier(s) that should be repeated and which resource blocks of the non-anchor carrier(s) that should be repeated by the repeater node. Alternatively, these decisions could be made in a decision unit, which could be located in some other node according to preference. Within this document, the term "base station" covers also the logical node "eNB", where appropriate.

Throughout this description, the terms "anchor carrier" and "non-anchor carrier" could be replaced by other suitable terms, such as for example "legacy carrier" and "non-legacy carrier"

Embodiments of the invention provide a method and an arrangement that support the use of frequency selective repeaters in a system that may contain legacy mobile stations, which are not "aware" of the use of such frequency selective repeaters, since such repeaters were not used in the version of the standard according to which these mobile stations are functioning. The repeaters are controlled to perform frequency selective repetition, whereby the granularity of the frequency selectivity is matched to the bandwidth of the component carriers, which will be further described below.

Figure 7:
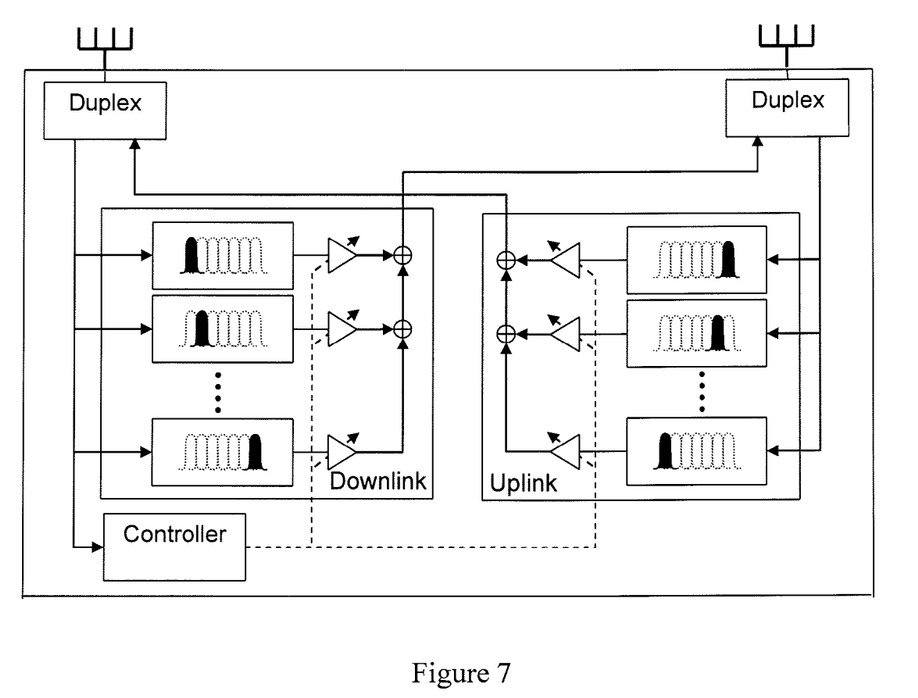
FIG. 7 illustrates a frequency selective repeater with controllable uplink and downlink filter banks according to one embodiment.

Frequency selective repetition can conceptually be thought of as a controllable filter bank as shown in FIG. 7, where a plurality of controllable filters are controlled to filter out, i.e. let pass through the filter, only the signals or frequencies which are desired to let pass.

As previously mentioned, the available spectrum is divided into two different kinds of carriers, namely anchor carriers and non-anchor carriers. Legacy mobile terminals are limited to use anchor carriers where as other mobile terminals may use all carriers.

An anchor carrier is characterised by that it appears as a normal carrier to a legacy mobile terminal. As an example, a Release-8 LTE mobile terminal may make use of all Release-8 control channels, e.g. PDCCH, BCH, SSS, PSS, PUCCH and PRACH, on an anchor carrier. A Release-10 LTE-Advanced mobile terminal may or may not find additional control information on this carrier, which information is not visible to a LTE Release-8 mobile terminal. The E-UTRA (LTE Release-8) downlink control channel structure is illustrated in FIG. 4 and FIG. 5.

The granularity of the downlink frequency selectivity in a repeater node for an anchor carrier is limited by the anchor carrier bandwidth, i.e. either the whole anchor carrier is repeated by the repeater node or it is not repeated at all, due to the fact that the control channels of the anchor carriers, which must be repeated, are interleaved or spread over the entire carrier. The uplink frequency selectivity of anchor carriers may, however, be of finer granularity as long as the PDCCH and the PRACH are repeated, due to that these channels, which must be repeated, are located in well defined resource blocks of the UL anchor carriers. The E-UTRA (LTE Release 8) uplink control channel structure is illustrated in FIG. 6.

A non-anchor carrier is characterised by that it is not readable by legacy mobile stations. The granularity of the downlink frequency selectivity in a repeater node for a non-anchor carrier depends on how the downlink control channels are designed. If the non-anchor carrier do not carry any control channels, as illustrated in FIG. 3, the granularity of the frequency selectivity in the repeater node may be finer than the bandwidth of the non-anchor carrier, as illustrated in FIG. 8, i.e. the repeater node may repeat only selected parts of the non-anchor carrier. If, on the other hand, the non-anchor carrier carries control channels, which cover the whole bandwidth of the carrier, the granularity of the frequency selective repeater is limited by the bandwidth of the component carrier, i.e. the bandwidth of the non-anchor carrier, as illustrated in FIG. 9. Therefore, in order to increase the frequency selectivity, it is desirable to aim at avoiding control channels which cover the bandwidth of the non-anchor carriers. However, frequency selective repetition may sometimes be possible, either in all subframes or in some subframes of a non-anchor carrier which carries control channels.

Figure 8A:
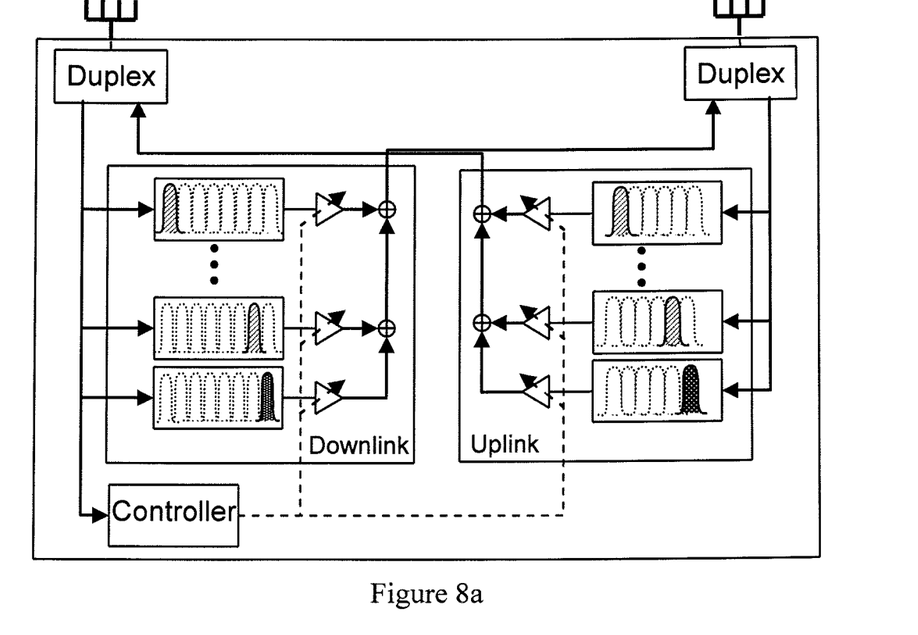
FIG. 8-9 illustrate frequency selective repeaters and corresponding carrier distribution according to different embodiments.
Figure 8B:
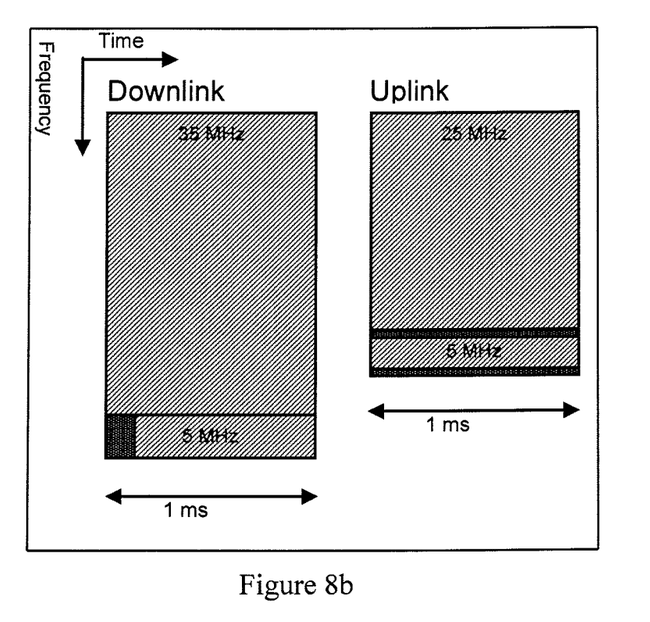

FIG. 8a exemplifies a frequency selective repeater node according to one embodiment of the invention. As illustrated in FIG. 8b, the repeater node operates in a configuration where two downlink component carriers: one anchor carrier of 5 MHz and one non-anchor carrier of 35 MHz, are aggregated into one downlink carrier of 40 MHz, and two uplink component carriers: one anchor carrier of 5 MHz and one non-anchor carrier of 25 MHz are aggregated into one uplink carrier of 30 MHz. As can be seen from FIG. 8a, the 5 MHz anchor carriers are matched by one filter each in the repeater node, i.e. are filtered by one filter each, while the wider 35 MHz and 25 MHz non-anchor carriers each are matched by a plurality of filters in the repeater node. In this example, the non-anchor carriers do not carry any control channels, and may therefore be partly repeated, and are therefore passed through a plurality of controllable filters. The anchor carriers, on the other hand, always carry control channels and therefore should be repeated in their entirety, and may therefore be passed through a single filter In a more general case, an anchor carrier may also be matched by, or correspond to, a plurality of filters in order for the repeater node to be able to dynamically adjust to the size of the anchor carrier, since the size of the anchor carrier may be changed dynamically. Further, as mentioned earlier, the granularity of the filtering of an uplink anchor carriers could be finer than the bandwidth of the anchor carrier due to the location of the control channels. An uplink anchor carrier may therefore be matched by a plurality of controllable filters and be partly repeated.

Figure 9A:
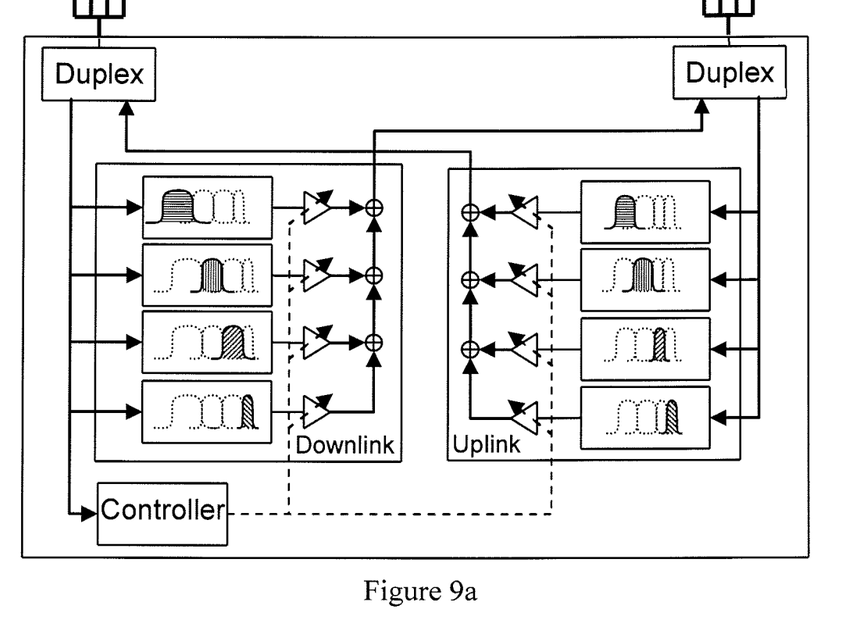
Figure 9B:
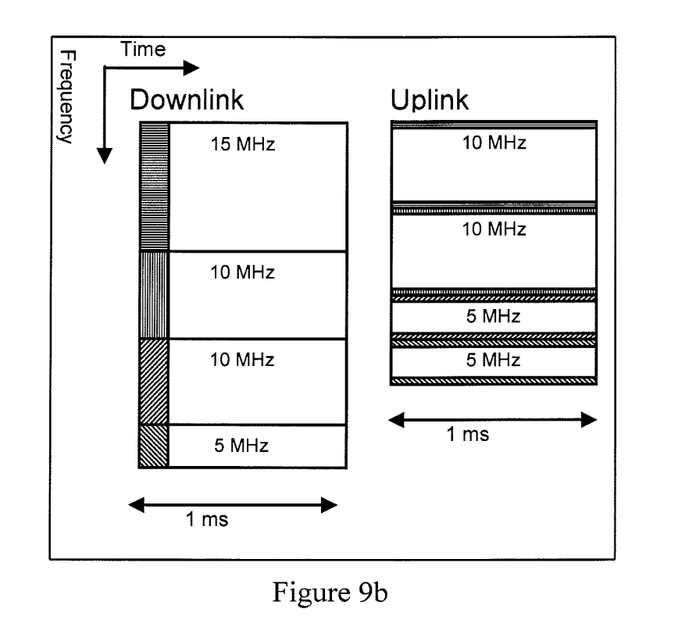

FIG. 9a illustrates a frequency selective repeater node according to one embodiment of the invention. As illustrated in FIG. 9b, the repeater node operates in a configuration where four downlink component carriers of 15, 10, 10 and 5 MHz respectively, are aggregated into one downlink carrier of 40 MHz, and four uplink component carriers of 10, 10, 5 and 5 MHz respectively are aggregated into one uplink carrier of 30 MHz. In this case each component carrier carries control channels, and are therefore repeated in their entirety in the downlink. Again, as in the example in FIG. 8, the component carriers in the uplink could be partially repeated due to the location of the control channels, and should then be filtered with a finer granularity than the respective component carriers. In this example, however, the repeater node is illustrated in FIG. 9a as to match each component carrier with one filter, and thereby disabling partial repetition of the component carriers.

The amount and size of both anchor carriers and non-anchor carriers may be changed dynamically in order to match the load on the respective carriers, and the repeater node must then be able to dynamically adjust the filters to match the carriers to be repeated. The required size of the sum of all anchor carriers in a cell depends on the amount of legacy traffic as well as the amount of control resources needed for non-legacy traffic. The required size of the sum of all anchor carriers that should be repeated by the repeater node depends on the amount of legacy LTE traffic to be repeated as well as the amount of control resources needed for non-legacy users served by any repeater node in the cell.

Adaptation of the anchor carriers may be done by adapting the size of a currently used anchor carrier, or by adding or subtracting anchor carriers. The mobile terminals need to be informed of any changes made to the component carries. A new anchor carrier is created either by reconfiguring a non-anchor carrier to become an anchor carrier, or by creating a new component carrier and configuring this new carrier to be an anchor carrier, see also illustrations in FIGS. 10 and 11. Legacy mobile terminals may be ordered to perform a handover to the new anchor carrier, since the new anchor carrier is perceived as a new cell by the legacy mobile terminals. The LTE-Advanced mobile terminals may be informed of the new anchor carrier, and the old anchor carrier may be removed. Power ramping may be used on the new anchor carrier in order to avoid RACH rush.

Furthermore, it is assumed in this case that the base station is in control of the above-mentioned procedures, i.e. it is the base station that determines the size and location of the component carriers and signals this to affected nodes in the network, e.g. to controlled repeater nodes, neighboring base stations or MMEs in its pool. It is further assumed that the base station determines which component carriers that should be anchor carriers and non-anchor carriers, respectively, and signals this to affected nodes in the network, e.g. to controlled repeater nodes and neighboring base stations. It is further assumed that the base station determines which anchor carriers as well as which resource blocks of non-anchor carriers that the repeater node should repeat and that the base station signals this to the repeater node. It is also assumed that the base station determines which anchor carrier that a legacy mobile station should camp on and signals this to the mobile station.

Figure 10A:
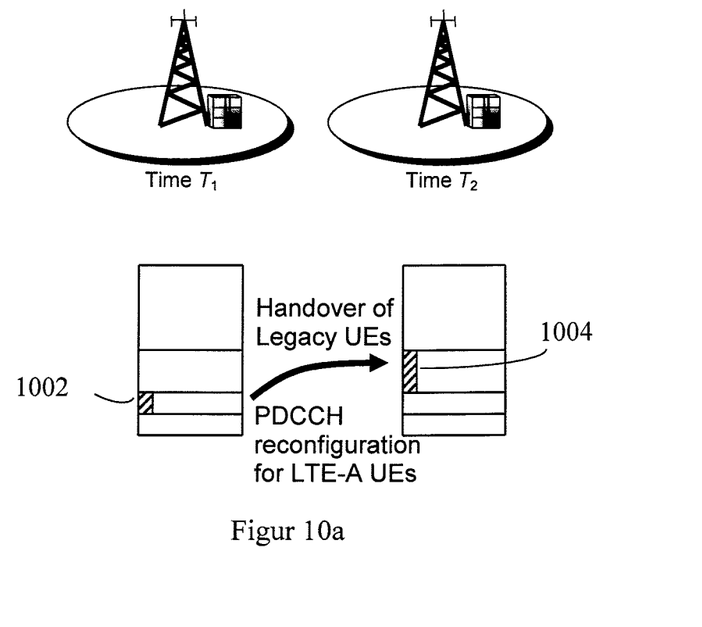
FIGS. 10a and 10b illustrate reconfiguration of anchor carriers according to different embodiments.

FIG. 10a illustrates an anchor carrier adjustment between time T1 and time T2 according to one embodiment of the invention. An anchor carrier 1002 is used at T1. A new anchor carrier 1004 is created at T2, which has a wider bandwidth than the anchor carrier 1002 at T1. The new anchor carrier 1004 is created for example by reconfiguring a non-anchor carrier. The new anchor carrier 1004 used at T2 replaces the anchor carrier 1002 used at T1, and the anchor carrier 1002 used at T1 is terminated. The legacy mobile terminals using the anchor carrier 1002 at T1 are handed over to the new anchor carrier 1004 at T2, and the PDCCH is reconfigured for non-legacy mobile terminals such as LTE-A mobile terminals.

Figure 10B:
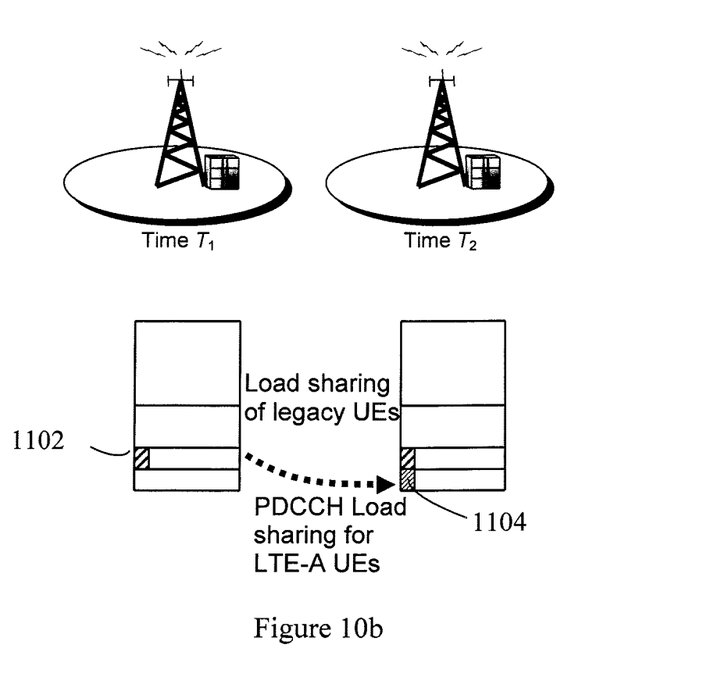

FIG. 10b illustrates an anchor carrier adjustment between time T1 and time T2 according to another embodiment of the invention. In this example, the anchor carrier 1102 used at T1 is still in use at T2, and an additional anchor carrier 1104 has been created at T2, which may share the load of the original anchor carrier 1102.

The location of the anchor carriers in a frequency aspect could be coordinated between neighboring cells to allow re-use on UL and DL control channels. The size of the anchor carriers as well as the number of anchor carriers may differ in uplink and downlink. The component carriers may also be scattered in frequency.

Figure 11:
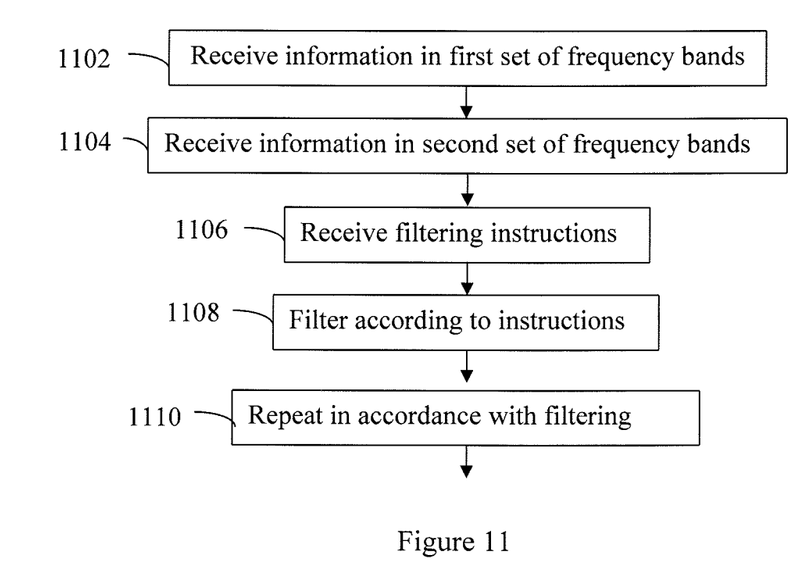
FIG. 11 is a flow chart illustrating an embodiment of procedure steps in a repeater node for enabling frequency selective repetition.

FIG. 11 is a flow chart, which illustrates steps in a procedure of using the above described frequency selective repetition procedure, according to one embodiment. In a first part of the procedure, information is received in both a first and a second set of frequency bands in steps 1102-1104, respectively. The information in the first set of frequency bands may be e.g. control information and data to or from legacy or non-legacy terminals. The information in the second set of frequency bands is only related to non-legacy terminals. Further, instructions or information concerning which frequency bands that should be repeated by the repeater node is received in step 1106. These instructions or information could be in form of actual frequencies or frequency intervals, but may also be expressed as e.g. carrier indexes and/or resource block indexes or other features, as long as the repeater node can extract which sets of frequency bands to repeat from this information. After receiving the instructions, the frequency bands comprising the information which it is desirable to repeat, are filtered out in step 1108, i.e. these frequency bands are allowed to pass through the filters of the repeater node. Finally, in step 1110, the frequency bands which have been filtered out in the previous step are repeated, e.g. they are amplified and forwarded to their destination.

Figure 12:
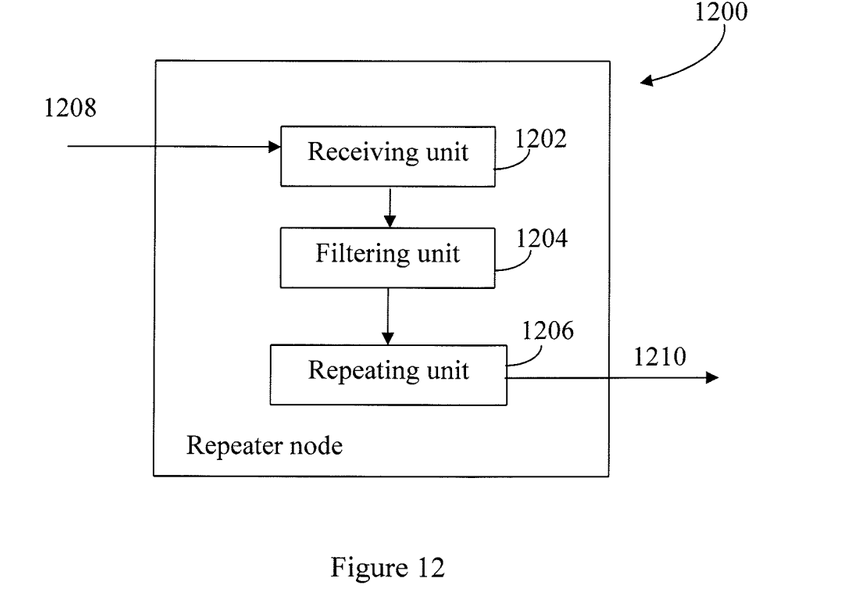
FIG. 12 is a block diagram illustrating an embodiment of a repeater node.

FIG. 12 illustrates a repeater node 1200, which is adapted to enable use of one embodiment of the frequency selective repetition procedure, and which comprises a set of logical units. A receiving unit 1202 receives information in a first and second set of frequency bands, and further receives instructions concerning which of the received frequency bands that should be repeated by the repeater node. These desired frequency bands are then filtered out in the filtering unit 1204, whereafter the desired frequency bands are amplified and transmitted to their destination in the transmitting unit 1206.

It should be noted that FIG. 12 merely illustrates various functional units in the repeater node 1200 in a logical sense. However, the skilled person is free to implement these functions in practice using any suitable software and/or hardware means. Thus, the invention is generally not limited to the shown structure of the arrangement 1200.

Figure 13:
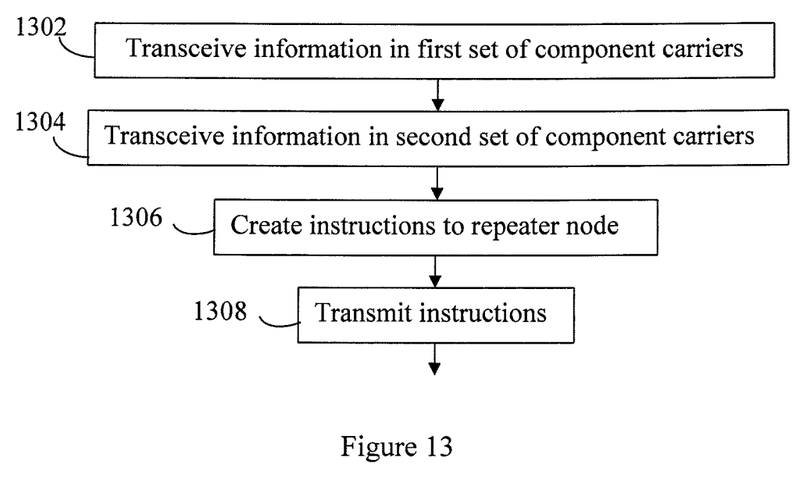
FIG. 13 is a flow chart illustrating an embodiment of procedure steps in a base station for enabling frequency selective repetition.

FIG. 13 is a flow chart, which illustrates the procedure steps in a base station of one embodiment of enabling the use of the above described frequency selective repetition procedure. Initially, in steps 1302 and 1304, information is transceived in a first and second set of component carriers. The term "transceive" is used to illustrate that the information can be either transmitted or received, depending on if it is a downlink or uplink scenario that is illustrated/described. In step 1306, instructions or information concerning which component carrier(s) or subset thereof that should be repeated by a repeater node, is transmitted to said repeater node. The instructions concern component carriers which are transmitted by the base station, or component carriers that are transmitted by, for example, a mobile terminal and that are to be received by the base station after frequency selective repetition. The procedure steps are performed in different order depending on whether the instructions concern transmitted or to-be-received component carriers. Further, instructions concerning transmitted component carriers could be transmitted before, during or possibly after the transmission of the corresponding component carriers. Instructions concerning to-be-received component carriers must, however, be transmitted before the corresponding component carriers are received, for natural reasons. The base station has knowledge concerning to-be-received component carriers since it is the base station which schedules mobile terminals within its cell(s).

Figure 14:
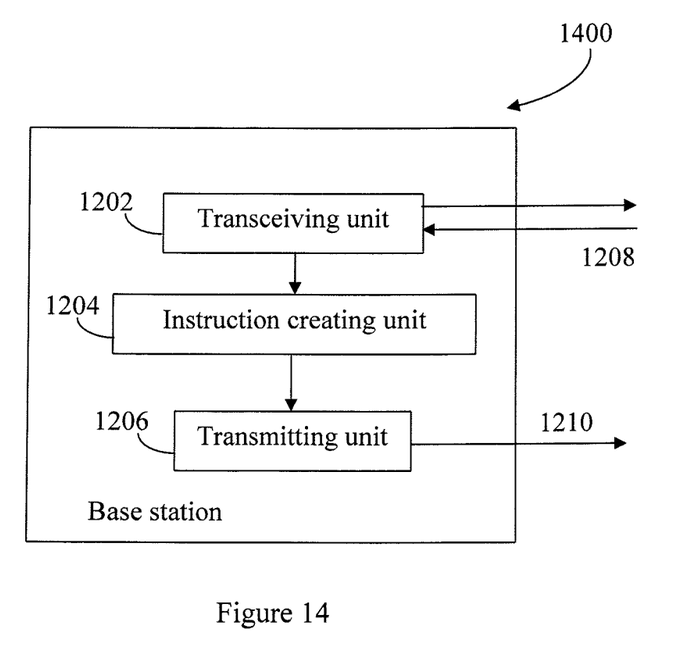
FIG. 14 is a block diagram illustrating an embodiment of a base station.

FIG. 14 illustrates a base station 1400, which is adapted to enable use of one embodiment of the frequency selective repetition procedure, and which comprises a set of logical units. A transceiving unit 1402 transmits or receives information in a first and a second set of frequency bands. The term "transceiving unit" only implies that the unit has capability to transmit and receive signals, and not how this unit is implemented. The transceiving unit could also have been illustrated by a transmitting unit and a receiving unit. Further, an instruction creating unit 1406 creates instructions to a repeater node concerning which component carrier(s) or subset thereof to repeat. Finally, these created instructions are transmitted to the repeater node by a transmitting unit 1408. This transmitting unit could be the transmitting part of the transceiver unit 1402

It should be noted that FIG. 14 merely illustrates various functional units in the base station 1400 in a logical sense. However, the skilled person is free to implement these functions in practice using any suitable software and/or hardware means. Thus, the invention is generally not limited to the shown structure of the arrangement 1400.

Even though the invention is mainly targeted at a system comprising legacy and non-legacy mobile terminals, embodiments of the invention are still relevant in a "non-legacy only" system.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. Although the description has mainly described LTE Release-8 and LTE-Advanced Release-10, the scope of the invention is not limited hereto. The invention is generally defined by the following independent claims.

The invention claimed is:

1. Method in a repeater node for enabling frequency selective repetition of signals in a telecommunication system in which aggregation of component carriers is applied, said method comprising the steps of:

receiving information signals in a first set of frequency bands defined to cover anchor carrier(s), receiving information signals in a second set of frequency bands defined to cover non-anchor carrier(s), receiving instructions concerning which frequency band(s) or subset thereof that should be repeated, filtering out the frequency band(s) to be repeated according to the received instructions, repeating the frequency band(s) to be repeated according to the received instructions, wherein the first set of frequency bands can be used by both legacy and non-legacy terminals, and the second set of frequency bands only can be used by non-legacy terminals.

2. The method according to claim 1, wherein the granularity of the filtering is matched to the bandwidth of each component carrier in a set of component carriers.

3. The method according to claim 1, wherein the granularity of the filtering of a component carrier is finer than the bandwidth of said component carrier.

4. The method according to claim 1, wherein the granularity of the filtering of a non-anchor carrier is finer than the bandwidth of said non-anchor carrier.

5. The method according to claim 1, wherein the sets of frequency bands are dynamically adjusted to match the distribution of the load on respective set of frequency bands.

6. The method according to claim 5, wherein the bandwidth of the component carrier(s) and/or the amount of component carriers are dynamically adjusted.

7. The method according to claim 1, wherein a new anchor carrier is created either by reconfiguring a non-anchor carrier or by creating a new component carrier and configuring said new component carrier to be an anchor carrier.

8. The method according to claim 1, wherein at least a part of the first set of frequency bands is repeated.

9. Repeater node adapted to enable frequency selective repetition in a telecommunication system in which carrier aggregation of component carriers is applied, said repeater node comprising:

a receiving unit, adapted to receive:

information in a first set of frequency bands defined to cover anchor carrier(s), and information in a second set of frequency bands defined to cover non-anchor carrier(s), instructions concerning which frequency band(s) or subset thereof to repeat, a filtering unit, adapted to filter out the frequency band(s) to be repeated according to the received instructions, a repeating unit, adapted to repeat the frequency band(s) to be repeated according to the received instructions, wherein the first set of frequency bands can be used by both legacy and non-legacy terminals, and the second set of frequency bands only can be used by non-legacy terminals.

10. The repeater node according to claim 9, wherein the filtering unit is further adapted to match the granularity of the filtering to the bandwidth of each carrier in a set of component carriers.

11. The repeater node according to claim 9, wherein the filtering unit is further adapted to have a granularity of the filtering of a component carrier that is finer than the bandwidth of said component carrier.

12. The repeater node according to claim 9, wherein the filtering unit is further adapted to have a granularity of the filtering of a non-anchor carrier that is finer than the bandwidth of said non-anchor carrier.

13. The repeater node according to claim 9, wherein the filtering unit is further adapted to dynamically adjust the filtering in accordance with dynamical changes in the component carriers.

14. The repeater node according to claim 9, wherein the repeater node is further adapted to repeat at least a part of the first set of frequency bands.

15. Method in a base station for enabling frequency selective repetition in a telecommunication system in which carrier aggregation of component carriers is applied, said method comprising the steps of:

transceiving information on a first set of component carriers defined to be anchor carrier(s), transceiving information on a second set of component carriers defined to be non-anchor carrier(s), creating instructions to a repeater node concerning which component carrier(s) or subset thereof to repeat, transmitting the instructions to the repeater node, wherein the first set of component carriers can be used by both legacy and non-legacy terminals, and the second set of component carriers only can be used by non-legacy terminals.

16. The method according to claim 15, wherein the sets of component carriers are dynamically adjusted to match the distribution of the load on respective set of component carriers.

17. The method according to claim 15, wherein the bandwidth of the component carrier(s) and/or the amount of component carriers are dynamically adjusted.

18. The method according to claim 15, wherein a new anchor carrier is created either by reconfiguring a non-anchor carrier or by creating a new component carrier and configuring said new component carrier to be an anchor carrier.

19. The method according to claim 15, wherein the instructions to the repeater node comprises information, which leads to that at least a part of the first set of frequency bands is repeated by the repeater node.

20. Base station adapted to enable frequency selective repetition in a telecommunication system in which carrier aggregation of component carriers is applied, said base station comprising:

a transceiving unit adapted to transceive information on:

a first set of component carriers defined to be anchor carrier(s), a second set of component carriers defined to be non-anchor carrier(s), an instruction creating unit adapted to create instructions to a repeater node concerning which component carrier(s) or subset thereof to repeat, a transmitting unit adapted to transmit the instructions to the repeater node, wherein the first set of component carriers can be used by both legacy and non-legacy terminals, and the second set of component carriers only can be used by non-legacy terminals.

21. The base station according to claim 20, wherein the base station further comprises:

a control unit, adapted to dynamically adjust the sets of component carriers in order to match the distribution of the load on respective set of component carriers.

22. The base station according to claim 21, wherein the control unit is further adapted to dynamically adjust the bandwidth of the component carrier(s) and/or the amount of component carriers.

23. The base station according to claim 21, wherein the control unit is further adapted to create a new anchor carrier either by reconfiguring a non-anchor carrier or by creating a new component carrier and configuring said new component carrier to be an anchor carrier.

24. The base station according to claim 20, wherein the instruction creating unit is further adapted to include information which leads to that at least a part of the first set of frequency bands is repeated by the repeater node.

* * * * *